United States Patent [19]

Aylward

[11] Patent Number: 4,792,994
[45] Date of Patent: Dec. 20, 1988

[54] RADIO EQUIPPED THERMOS

[76] Inventor: Richard A. Aylward, 10 Green Acres Dr., Mansfield, Mass. 02048

[21] Appl. No.: 117,723

[22] Filed: Nov. 6, 1987

[51] Int. Cl.[4] .................. H04B 1/06; H05K 11/00; A47B 5/00; A45C 11/20
[52] U.S. Cl. .................. 455/344; 455/351; 206/542; 62/457; 312/7.1
[58] Field of Search .............. 455/344, 351, 66, 347; 62/371, 331, 457; 206/541, 542, 216; 312/7.1, 237, 246

[56] References Cited

U.S. PATENT DOCUMENTS 1,750,032  3/1930  Timtiman .
1,752,196  3/1930  Patrie .
3,541,452 11/1970  Disesa et al. .............. 455/351 X
4,279,342  1/1981  Van Pelt .................. 206/542
4,571,740  2/1986  Kirby et al. .............. 455/344
4,700,395 10/1987  Long ..................... 62/457 X Primary Examiner—Robert L. Griffin
Assistant Examiner—Ralph E. Smith
Attorney, Agent, or Firm—Henderson & Sturm

[57]  ABSTRACT

A combined apparatus (10) comprising a standard thermos member (11) and a radio member (12), wherein the thermos member (11) includes a thermos body (13) having a base element (15), and wherein the top portion of the housing element (20) of the radio member (12) is operatively connected to the base element (15) of the thermos member (11).

3 Claims, 1 Drawing Sheet

RADIO EQUIPPED THERMOS

TECHNICAL FIELD

The present invention relates to thermos constructions in general, and more particularly to the combination of a radio that cooperates with a standard thermos configuration.

BACKGROUND OF THE INVENTION

As can be seen by reference to the following U.S. Pat. Nos.: 4,571,740; 4,279,342; 1,750,032 and 1,752,196; the prior art is replete with myriad and diverse constructions which employ the combination of a radio used in conjunction with non-analogous distinct structural components. As shown in the aforementioned prior art patents, radios have been incorporated into such diverse structures as pens, flashlights, lunch boxes, etc.

While all of these combined structures represent unique end products and are more than adequate for their intended purpose and function, the way the diverse structures cooperate with the radio component differs widely between arrangements; wherein, the radio is formed as an integral component of the combined structure to arrangements, or, wherein the radio is designed to be a removable component of the combined structure.

Obviously the prior art patents do not represent the last word in combining a radio with a diverse structure, in as much as there ar myriad ways that a radio can be incorporated into a disparate construction to not only produce a new combination, but also to produce a new and unique cooperation between the radio and the structure to which the radio is operatively attached.

SUMMARY OF THE INVENTION

The present invention comprises in general the combination of a radio with a standard thermos construction, wherein the radio is designed and adapted to form an extension to the base of the thermos.

Given the fact that most workmen and outdoorsmen utilize a thermos more frequently than other types of large volume food or liquid receptacles during the course of a normal day, coupled with the fact that both of these types of individuals have the occasional need or desire to be provided with a readily available source of music, news, sports, weather, etc.; it comes as somewhat of a surprise that up until the present time no one had come up with the idea of combining a radio with a standard thermos construction.

In addition, since the present invention causes the radio to function as the base of the thermos, the presence of the radio on the bottom of the thermos will lend stability to the combined structure, particularly as the liquid contents of the thermos are depleted.

BRIEF DESCRIPTION OF THE DRAWINGS

These and other objects, advantages, and novel features of the invention will become apparent from the detailed description of the best mode for carrying out the preferred embodiment of this invention which follows, particularly when considered in conjunction with the accompanying drawings, wherein.

BEST MODE FOR CARRYING OUT THE INVENTION

Figure 1:
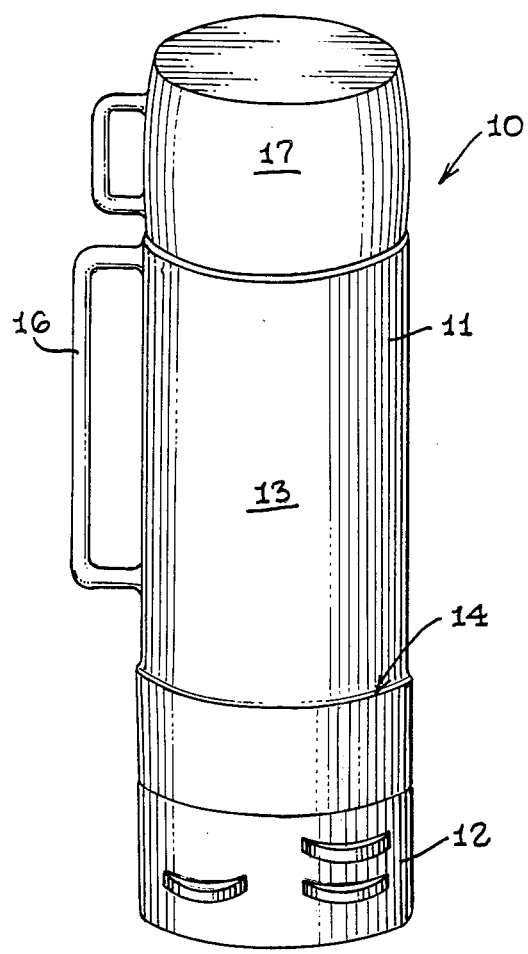
FIG. 1 is an elevational front view of the combined structure of this invention.

As can be seen by reference to the drawings and in particular to FIG. 1, the combined apparatus that forms the basis of the present invention is designated generally by reference numeral (10). The combined apparatus (10) comprises in general a standard thermos member (11) and a radio member (12). These members will now be described in seriatim fashion.

As can best be seen by reference to FIG. 1, the standard thermos member (11) comprises a generally elongated cylindrical thermos body (13) having an enlarged generally cylindrical flanged portion (14) formed on the lower end of the thermos body (13) which serves as the base element (15) of the thermos member.

In addition, the standard or typical thermos member (11) is usually provided with: a handle element (16) which is attached to the periphery of the thermos body (13), and a cap element (17) which is threadedly secured to the top portion of the thermos body (13) in a well recognized fashion.

Figure 2:
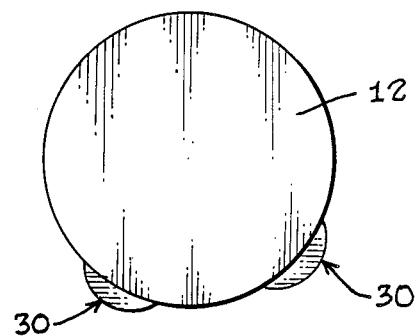
FIG. 2 is a cross-sectional view thru line 2—2 of FIG. 1.
Figure 3:
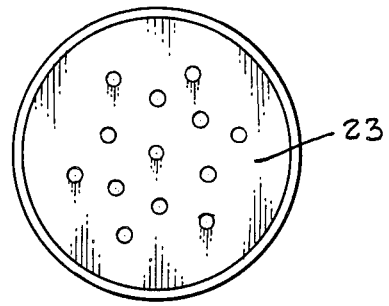
FIG. 3 is a bottom plan view of the combined structure.

As is best depicted in FIGS. 1 thru 3, the radio member (12) of the preferred embodiment is operatively connected to the base element (15); wherein, the radio member (12) comprises a generally cylindrical housing element (20) which contains the standard radio components such as power source (21) a receiver (22) and a speaker (23). These standard components are operatively connected together and controlled by a plurality of control knobs (30) such as an on-off switch (31) a volume control (32) and a station or frequency dial (33) in a well recognized fashion.

In the embodiment illustrated in FIG. 1, the radio member (12) is permanently affixed as by super adhesive to the bottom of the base element (15) of the thermos body (13), and is configured such that the radio member (12) forms a permanent and smooth extension of the thermos member base element (15).

Given the fact that standard thermos body constructions are fabricated from either magnetically attractive or magnetically inert materials, and there may be instances wherein the consumer would desire a releasable securing means (40) for operatively connecting the radio member (12) to the thermos member (11); this invention contemplates two such alternate embodiments as will be explained presently.

Figure 4:
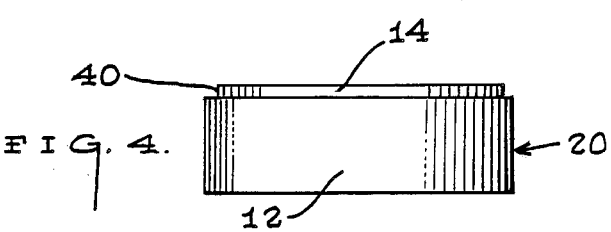
FIG. 4 is an isolated detail view of one embodiment of the radio component of this invention.

In the first alternate embodiment of this invention depicted in FIG. 4, the thermos body (13) is fabricated from a magnetically attractive material, such as steel or the like, and as a consequence the upper portion of the radio housing element (20) is provided with a releasable securing means (40) in the form of a magnetic disk element (41) which will operatively, yet releasably, secure the radio member (12) to the base element (15) of the thermos member (11).

Figure 5:
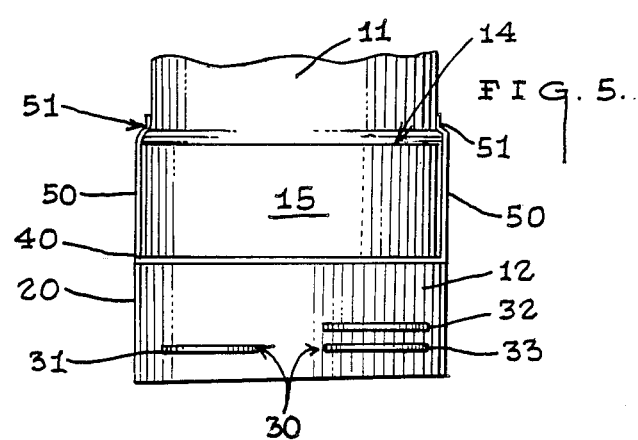
FIG. 5 is a partial detail view of another embodiment of the combined structure of this invention.

In the other alternative embodiment of this invention depicted in FIG. 5, the thermos body (13) is fabricated from a magnetically inert material such as plastic or the like. In this particular instance the upper portion of the radio housing member (200 is provided with a releasable securing means (40) in the form of an upwardly extending resilient element (50) such as a flexible skirt, a plurality of flexible fingers provided with inwardly extending portions (51) which will releasably engage the outwardly extending flanged portion (14) of the base element (15) for operatively connecting the radio member (12) to the thermos member.

It should further be noted that in all of the embodiments depicted and described with respect to FIGS. 1 thru 5 that the basic thermos construction has not been materially altered or modified from a structural integrity standpoint by either the permanent or releasable attachment of the radio member. This particular feature of the combined apparatus (10) is strongly emphasized and assumes significant importance when held in comparison to the uniform teachings and structures found in the prior art, wherein at least some significant structural modification or alteration of the non-radio component is required to accept the radio member per se.

Having thereby described the subject matter of this invention it should be obvious that many substitutions, modifications, and variations of the invention are possible in light of the above teachings. It is therefore to be understood that the invention as taught and described herein is only to be limited to the extent of the breadth and scope of the appended claims.

I claim:

1. A combined apparatus comprising:
   a standard thermos member including a generally cylindrical thermos body having a base element wherein the base element comprises a flanged portion formed on the lower end of the thermos body; and,
   a radio member including a generally cylindrical housing element wherein the top portion of the radio housing element is releasably secured to the base element of the said thermos body; and, the radio member is provided with releasable securing means which cooperate with the base element of said thermos member; wherein the said thermos body is fabricated from magnetically attractive material, and the releasable securing means comprise a magnetic disk attached to the top portion of the radio housing element.

2. A combined apparatus comprising:
   a standard thermos member including a generally cylindrical thermos body having a base element wherein the base element comprises a flanged portion formed on the lower end of the thermos body; and,
   a radio member including a generally cylindrical housing element wherein the top portion of the radio housing element is releasably secured to the base element of the said thermos body; and, the radio member is provided with releasable securing means which cooperate with the base element of said thermos member; wherein the said thermos body is fabricated from magnetically inert material, and the releasable securing means comprises an upwardly extending resilient element formed on the upper portion of the housing element.

3. The combined apparatus as in claim 2 wherein the said upwardly extending resilient element is provided with inwardly extending portions which engage the said flanged portion formed on the lower end of the thermos body.

* * * * *